United States Patent
Hurley et al.

(10) Patent No.: US 7,958,559 B2
(45) Date of Patent: Jun. 7, 2011

(54) METHOD, DEVICE AND COMPUTER PROGRAM PRODUCT FOR DETERMINING A MALICIOUS WORKLOAD PATTERN

(75) Inventors: Paul T. Hurley, Zurich (CH); Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 11/613,085

(22) Filed: Dec. 19, 2006

(65) Prior Publication Data
US 2007/0156771 A1 Jul. 5, 2007

(30) Foreign Application Priority Data
Dec. 19, 2005 (EP) .................................... 05112396

(51) Int. Cl.
*H04L 29/00* (2006.01)
(52) U.S. Cl. .............. 726/23; 726/24; 726/25; 713/187; 713/188
(58) Field of Classification Search .................... 726/22, 726/23, 24, 25; 713/187, 188
See application file for complete search history.

(56) References Cited

U.S. PATENT DOCUMENTS
2002/0194490 A1* 12/2002 Halperin et al. ................ 726/24
2004/0181684 A1* 9/2004 Hong et al. ..................... 726/24

FOREIGN PATENT DOCUMENTS
WO WO 2004/070509 A2 8/2004

* cited by examiner

*Primary Examiner* — Vivek Srivastava
*Assistant Examiner* — Thong Truong
(74) *Attorney, Agent, or Firm* — Ido Tuchman; William J. Stock

(57) ABSTRACT

For determining a malicious workload pattern, the following steps are conducted. A training set of workload patterns is collected during a predetermined workload situation. A subset of the training set is being determined as an archetype set, the archetype set being considered to be representative of the predetermined workload situation. A threshold value dependent on the training set and the archetype set, and an evaluation value dependent on a given workload pattern and the archetype set are calculated. The given workload pattern is determined to be malicious if the evaluation value fulfils a given condition with respect to the threshold value.

19 Claims, 3 Drawing Sheets

FIG. 3

$$\text{comp}(w1[], w2[], i) := \begin{cases} 0; & \text{if } ((w1[i] >= w1[\text{mod}(i,n)+1] \text{ AND } w2[i] >= w2[\text{mod}(i,n)+1]) \\ & \text{OR } (w1[i] <= w1[\text{mod}(i,n)+1] \text{ AND } w2[i] <= w2[\text{mod}(i,n)+1])), \\ & \text{with } 0 < i <= n \\ 1; & \text{otherwise} \end{cases}$$

$d(w1,w2) = d(w1[], w2[]) := 1/n * \text{SUM}(\text{comp}(w1[], w2[]i))$, with $0 < i <= n$

METHOD, DEVICE AND COMPUTER PROGRAM PRODUCT FOR DETERMINING A MALICIOUS WORKLOAD PATTERN

CROSS-REFERENCE TO RELATED APPLICATIONS

This application claims priority under 35 U.S.C. §119 to European Patent Application No. 05112396.6 filed Dec. 19, 2005, the entire text of which is specifically incorporated by reference herein.

BACKGROUND OF THE INVENTION

The present invention relates to a method and a device for determining a malicious workload pattern. It further relates to a computer program product enabling to perform a method for detecting a malicious workload pattern. A malicious workload pattern is a workload pattern that does not show typical characteristics of a normal or predetermined operation of a system.

Reliability and high availability are of great importance for services in information technology. Often services are provided for a plurality of applications or clients and are accessed via a network system. Resources and devices that either provide the resources (server, storage devices, databases etc.) or provide access to the resources (routers, switches, gateways, transmission lines etc.) are thereby shared among a plurality of users. In certain situations, the resource demand might exceed the capability of one or more of the devices. Such overload situations may temporarily, or even for a continuing period of time, lead to service failure. It is therefore an important task to detect such overload situations or, even better, to detect the emergence of overload situations so as to be able to react in advance.

Overload situations can be recognized by analyzing the workload of a device. If an actual workload deviates from the typical workload of a device operating under normal conditions it is considered to be a malicious or problematic workload being indicative of an overload or an emerging overload situation.

According to WO 2004/070509 A2 the workload within a network can, for example, be defined as the number of a certain type of accesses to a device per time interval, for example usage of a port over TCP/IP (transport control protocol/internet protocol). The workload is detected to be malicious if an actual workload exceeds a certain threshold representing an average workload. However, reducing a complex workload situation to the rate of usage of a device might be appropriate to detect some problematic situations, but is in general too simplified to detect others.

Other approaches to detect malicious workloads are therefore particularly focused on the content of requests, for example as described in US 2004/181684, where malicious code patterns are searched for in control and data traffic. Such methods are useful in the context of network security since they are able to detect so-called worm or virus intrusions into a system. Worms and viruses are designed to replicate themselves and may, if not suppressed, therefore lead to an overload situation, sometimes called a denial of service attack (DoS). However, workload analysis based on the content of traffic is only successful if code patterns of dangerous traffic are known and is also more time-consuming. Also, the only malicious workload situations that are detected are those caused by an illegal intrusion into the system, while other malicious workload situations are not detected, even if also leading to the failure of a service.

It is therefore a challenge to provide a method for detecting a malicious workload more effectively and more independent of its origin. It is furthermore a challenge to provide a device and a computer program product for detecting a malicious workload more effectively and more independent of its origin.

BRIEF SUMMARY OF THE INVENTION

According to one aspect of the invention, a method for determining a malicious workload pattern is provided that comprises, in a first group of steps, the steps of collecting a training set of workload patterns during a predetermined workload situation, followed by determining a subset of the training set as an archetype set, the archetype set being considered to be representative of the predetermined workload situation, and calculating a threshold value dependent on the training set and the archetype set. In a second group of steps, the method comprises the steps of calculating an evaluation value dependent on a given workload pattern and the archetype set, and determining the given workload pattern to be malicious, if the evaluation value fulfills a given condition with respect to the threshold value. The predetermined workload situation is also referred to as normal workload situation.

In the first group of steps, the collection of workload patterns rather than a single parameter related to a workload allows a more appropriate representation of a workload situation. The archetype set, being a subset of the training set can be smaller, even considerably smaller than the training set itself, albeit still being representative of the predetermined workload situation. This has the advantage that even if a training set is collected that comprises a larger number of workload patterns in order to cover a variety of workload situations, the archetype set can be small enough to allow to conduct the second group of steps of the method more effectively and with a limited calculation effort. Also, the calculation of the threshold value leads to further data reduction, yet preserves the characteristics of a workload situation.

In the second group of steps, the evaluation value allows for an easier assessment of the given workload pattern when compared with the threshold value.

In a preferred embodiment of the method, a plurality of given workload patterns are determined to be malicious by performing the first group of steps once for the plurality of given workload patterns and the last group of steps for each of the workload patterns of the plurality of given workload patterns. In this way, the more intensely computational steps of the first group of steps are performed only once for a plurality of given workload patterns.

In a further preferred embodiment of the method, the step of determining the archetype set comprises the steps of provision of a distance function dependent on a comparison of two workload patterns, the distance function resulting in a pattern-to-pattern distance between the two workload patterns and provision of an archetype set size, the archetype set size being the number of workload patterns to be in the archetype set and the archetype set size being smaller than or equal to a training set size, the training set size being the number of workload patterns in the training set. Out of all possible subsets of the training set, the archetype set is then determined to be the subset that exhibits the largest value of a set distance. The subsets comprise workload patterns, the number of which being equal to the archetype set size. The set distance of a subset is the smallest of all pattern-to-pattern distances between two workload patterns for all possible combinations of two workload patterns within the subset. Each pattern-to-pattern distance is determined with the distance function.

Determining the archetype set by using the distance function has the advantage that workload patterns from extremely diverging workload situations can be more easily found within the training set. The extrema are still present in the archetype set which ensures that the range of diverging workload patterns is as wide in the archetype set as it is in the training set.

In a further preferred embodiment of the method, the step of calculating the threshold value from the training set and the archetype set comprises the step of determining a pattern-to-set distance for each workload pattern of the training set, the pattern-to-set distance depending on the workload pattern and on the archetype set in that it is the smallest of all pattern-to-pattern distances between the workload pattern and each of the workload patterns of the archetype set as derived from the distance function, followed by the step of determining the threshold dependent on the largest of the pattern-to-set distances. In this way, the calculation of the threshold value also takes into consideration workload patterns from more extreme workload situations that are present in the training set.

In a further preferred embodiment of the method, the threshold value is determined dependent on a predetermined offset to the largest of the pattern-to-set distances. The offset allows the threshold value to be manually fine-tuned, for example by taking empiric data or knowledge into account. The offset can be positive as well as negative, leading to a stronger or a softer criterion for determining whether a given workload pattern is malicious or not.

In a further preferred embodiment of the method, the step of calculating the evaluation value for the given workload pattern comprises the step of calculating the distances between the given workload pattern and each of the workload patterns of the archetype set each pattern-to-pattern distance being determined with the distance function, followed by the step of determining the evaluation value to be the smallest of the pattern-to-pattern distances calculated in the step before. In this way, the calculation of the evaluation value can also take workload patterns from more extreme workload situations that are present in the archetype set into consideration.

In a further preferred embodiment of the method, the given workload pattern is determined to be malicious if the evaluation value is larger than the threshold value. This way, a simpler criterion for determining whether a given workload pattern is malicious or not is given.

In another group of further preferred embodiments of the method, the steps of determining a subset of the training set, calculating a threshold value, and calculating an evaluation value are based on an inverse distance function. Depending on the matrix of the workload patterns, the inverse distance function might be better suited to describe the variability between workload patterns. The resulting advantages of preferred embodiments based on the inverse distance function are the same as the advantage described above in conjunction with the distance function.

In a further preferred embodiment of the method, the workload patterns are dependent on a characteristic of the usage of a plurality of elements in a system. This definition of the workload pattern allows to apply the method to a variety of systems comprising a plurality of elements.

In a further preferred embodiment of the method, the elements are data communication ports and the system is a part of a network. In another further preferred embodiment of the method, the elements are addresses in a network. In yet another further preferred embodiment of the method, the usage of each element is representative of the number of accesses to the element through the network in a predetermined time interval. In these ways, the method is applicable to devices within a network system.

In a further preferred embodiment of the method, the distance function is dependent on the comparison of two workload patterns in that it relates to changes in a relative order of the elements, the relative order of the elements being determined by the characteristic of the usage of the elements. In this way, a more reliable detection of malicious patterns is ensured, in particular for typical network intrusions, as address or port scans.

According to the second aspect of the invention, a device for determining a malicious workload pattern is described, the device being adapted to conduct a method as described above.

According to a third aspect of the invention, a computer program product comprising a computer-readable medium embodying program instructions executable by a processor to perform a method as described above is presented.

BRIEF DESCRIPTION OF THE SEVERAL VIEWS OF THE DRAWINGS

FIG. 3 shows an example of a distance function used to compare two workload patterns.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Figure 1:
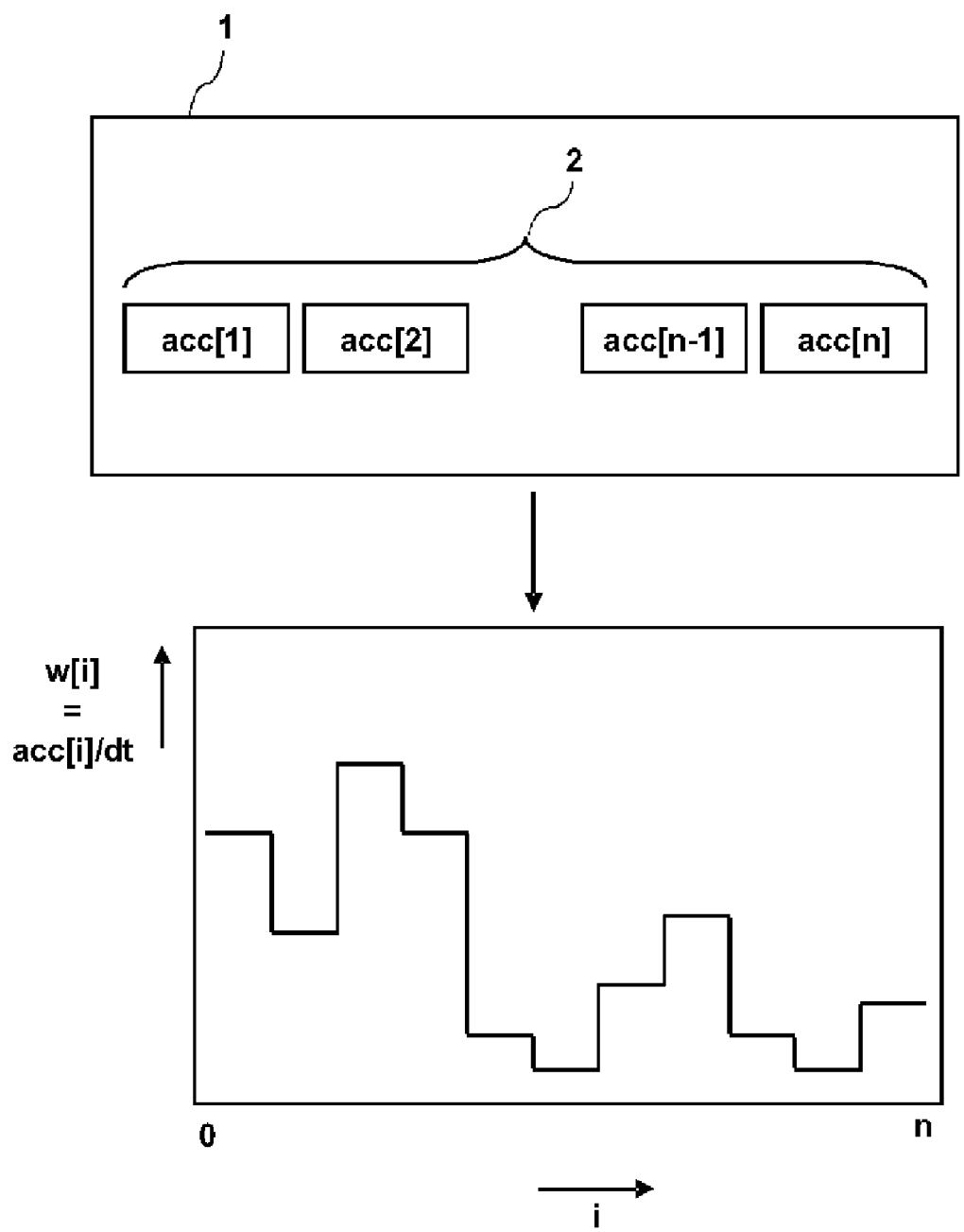
FIG. 1 shows a schematic diagram illustrating the definition of a workload pattern.

FIG. 1 shows a system 1 comprising a number n of elements 2. The elements 2 can be accessed and thereby used within the system 1 independently of each other. It is assumed that the elements 2 are labeled by an index i which is an ordinal number between 1 and n. The usage of the elements 2 is monitored. One way to monitor the usage of the elements 2 is for example to count the number of accesses during a for a predetermined time interval dt and store it in an array of the number of accesses acc[ ], wherein acc[i] refers to the number of accesses to the element 2 labeled by the index i. The number of accesses acc[i] counted within the time interval dt then forms a workload pattern w. The workload pattern w can therefore be regarded as an array w[ ] comprising n values: w=w[i], wherein i is an index with $1 < i < n$. An example of the workload pattern w is depicted in the form of a histogram as a graphical representation on the right-hand side of FIG. 1.

The system 1 may, for example, be a network system. The elements 2 could then be data communication ports of a device, e.g. a router or a gateway or a server within this network. The elements 2 could also be addresses or subaddresses or address ranges used within the network. In these cases, the usage of the elements 2 can be defined as the number of accesses to each element 2 in the predetermined time interval dt, as described above.

The system 1 may as well be a computer system, e.g. a server. The elements 2 could then be related to the memory or the processor used by processes, more particular for example the amount of memory that a process uses or the amount of processor time that a process uses. Again, the usage of the respective elements 2 is observed. To give an example, the elements 2 could be defined by the amount of memory used by a process, in that a first element corresponds to an amount of memory between 0 and 1 MB, a second element corresponds to an amount of memory between 1 MB and 2 MB, etc. An element 2 is then considered to be used if the observed process uses an amount of memory that lies within the range assigned to the element 2. The resulting workload pattern w then shows, how often the process uses a certain amount of memory. This describes the workload the process is subjected to in a rather complex manner.

Figure 2:
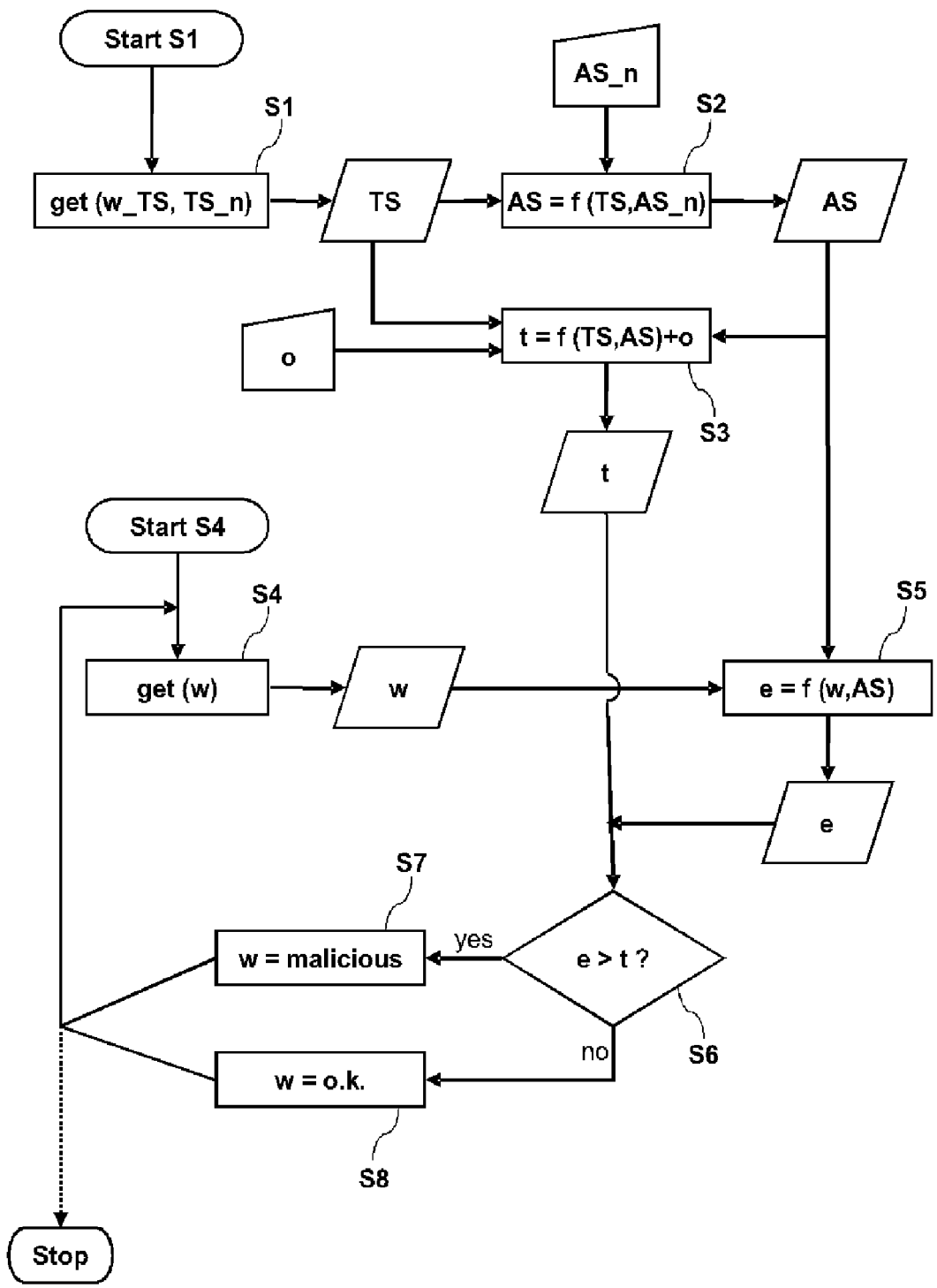
FIG. 2 shows a flowchart of a method for determining a malicious workload pattern.

In FIG. 2 one embodiment of a method for determining a malicious workload pattern is shown in more detail in a flowchart.

In step S1, several workload patterns w_TS are acquired, i.e. collected, from the system 1 when it is under a predetermined workload situation, also referred to as normal operation. Herein the term "normal operation" is meant to be a state of operation with a workload that is below a predetermined workload threshold value. Such value will be typically set high enough to allow a workload that utilizes the system 1 to a maximum level where it can operate with no or only negligible system failure or denial of service. A possible value of acceptable denial of service or failure could be e.g. 5%. The set of collected workload patterns w_TS is called training set TS. As described in conjunction with FIG. 1, each individual workload pattern w_TS stems from the measurement of the usage of elements 2 within the predetermined time interval dt. The individual workload patterns w_TS can originate from subsequent measurements. The number of workload patterns w_TS in the training set TS, in the following denoted as TS_n, is in principle not restricted. Since fluctuations in the usage of the elements 2 are not unusual, especially in systems where resources are shared by a several users, it is to be expected that the workload patterns w_TS vary from each other in a statistical and/or a systematical manner, e.g. depending on the time of the day, even if all workload patterns w_TS are considered to originate from a system under normal operating conditions. It is therefore preferred, that the number TS_n of workload patterns w_TS in the training set TS is large enough that the variety within the workload patterns w_TS is wide enough for the training set TS to be representative of the normal workload situation.

In step S2 a subset, called archetype set AS, comprising a given number AS_n of workload patterns w_TS from the training set TS is selected, i.e. determined. The archetype set AS is selected in a way that it is also suited to represent the normal workload situation, while preferably having a smaller number of members AS_n than the number of members TS_n of workload patterns w_TS in the training set TS. This can, for example, be achieved on the basis of a measure suitable to compare workload patterns w with each other.

In one embodiment of the invention, the measure suitable to compare workload patterns w is a distance function d. The distance function d takes two workload patterns w as an input, e.g. d=d(w1, w2) wherein w1 and w2 are a first and a second workload pattern. The distance function d results in a value that could be a vector of any dimension, but preferentially is a single number and preferably a single positive number, called pattern-to-pattern distance. The distance function d is named distance function since it determines how far two workload patterns w are apart from each other concerning certain characteristics. Two workload patterns w that are more similar concerning the certain characteristics will have a smaller pattern-to-pattern distance to each other, workload patterns w that are rather different concerning the certain characteristics will have a larger pattern-to-pattern distance to each other two. The pattern-to-pattern distance of a workload pattern to itself, i.e. d(w,w), will consequently lead to the smallest possible value in the range of values of the distance function d, e.g. to zero, independent of the workload pattern w. Also, the distance function d is commutative, i.e. d(w1, w2) is equal to d(w2, w1).

Alternatively, an inverse distance function can be used to compare workload patterns w, where the inverse distance function has the same properties as the distance function d, except for resulting in a larger inverse pattern-to-pattern distance when applied to two workload patterns w that are more similar concerning the certain characteristics, and a smaller inverse pattern-to-pattern distance when applied to two workload patterns w that are more different concerning the certain characteristics.

An example of the distance function d in one preferred embodiment of the method is given in FIG. 3. As described in conjunction with FIG. 1, it is assumed that there is the number n of elements 2 monitored. Workload patterns w are collected as workload pattern arrays comprising n values: w=w[i], 1<i<=n.

An auxiliary comparison function comp is defined, that takes two workload patterns w1 and w2 and the index i (0<i<=n) as inputs and results in one of the two possible values "0" and "1". Using the auxiliary comparison function comp, the usage of the element 2 having the index i is compared to the usage of it succeeding element 2 having the index (i+1). The successor of the element 2 having the index i=n is defined as the element with the index i=1 (cyclic arrangement). In the formula given in FIG. 3, mod [i, n] denotes the modulo-function used to determine the successor of an element under the premise of a cyclic arrangement. AND and OR are Boolean operators. The auxiliary comparison function comp delivers a result of "0" if the usage of an element 2 labeled by the index i, as given by a first and a second workload pattern w1 and w2, represented as a first and a second workload pattern array w1[i] and w2[i], is either higher or equal in both workload patterns w1 and w2 or lower or equal in both workload patterns w1 and w2 than the usage of the succeeding element, otherwise it delivers a result of "1". In other words, the auxiliary comparison function comp is sensitive to the local (local within the workload pattern w) magnitude of the usage. If the order of the elements 2 is defined by the magnitude of their usage, the auxiliary comparison function comp can also be seen as being sensitive to the relative (relative since two patterns are compared with each other) order of the elements 2. The distance function d is then defined as the arithmetic average of all results of the auxiliary comparison function comp for all n elements 2. The arithmetic average is the sum of all results of the auxiliary comparison function, given by the SUM operator in the formula, divided by the number of elements n. The distance function d is therefore also sensitive to the local magnitudes of the usage of the plurality of elements and thus also to the relative order of the elements 2.

Using the distance function d and pattern-to-pattern distances, a set distance of a set of workload patterns is defined as the smallest of all pattern-to-pattern distances between two workload patterns w within the set.

With the given number AS_n of workload patterns w within the archetype set AS, all subsets of the training set TS having AS_n workload patterns w are examined in that their set distance is determined. The subset having the largest set distance is chosen as the archetype set AS.

Referring now back to FIG. 2, in step S3 both training set TS and archetype set AS are used to calculate a threshold value t. The threshold value t is used in the following steps S4 to S6 in the process of assessing whether a given workload pattern w is determined to be malicious or not. The threshold value t is defined in a way that each workload pattern w_TS of the training set TS would be determined not to be malicious when being assessed in the following steps S4 to S6.

In the preferred embodiment described above, where workload patterns w are compared using the distance function d, the threshold value t can be determined as follows: For each workload pattern w_TS of the training set TS, a pattern-to-set distance, depending on the workload pattern w_TS and on the archetype set AS is determined in that it is the smallest of all pattern-to-pattern distances between the workload pattern w_TS and each of the workload patterns of the archetype set AS. The threshold value t can then be calculated dependent on the largest of the pattern-to-set distances, for example in that it is the largest of the pattern-to-set distances. In another embodiment, the threshold value t can be calculated dependent on the largest of the pattern-to-set distances and a predetermined offset o, for example in that it is the largest of the pattern-to-set distances plus the offset o. Through the offset o empiric data and experience can be taken into account. This can help to avoid an erroneous determination of a workload pattern to be malicious due to a training set TS that is not large enough to be representative of the normal operation or due to statistical fluctuations. The offset o can be positive as well as negative, leading to a stronger or a softer criterion for determining whether a given workload pattern is malicious or not.

The first three steps S1 to S3 can be seen as calibration steps, since they are only performed once for the system 1 in a given context. It is preferred to repeat these steps whenever the system 1 or one of its components change or when the usage of the system 1 changes. The steps S1 to S3 of course may also be repeated on a regular basis to automatically adjust to changes in the system 1.

On the contrary, the steps S4 to S6 are performed for each given workload pattern w to be assessed. In step S4 a workload pattern w to be assessed is acquired. The routine to acquire the workload pattern w and the parameters used in this process (elements 2, predetermined time dt etc.) are the same as in the process of acquiring the workload patterns w_TS of the training set TS to be comparable. Step S4 results in a given workload pattern w.

In step S5 an evaluation value e is calculated based on the given workload pattern w and the archetype set AS. In terms of the distance function d as described above, the evaluation value e can be defined as the largest of all pattern-to-pattern distances between the given workload pattern w and each member of the archetype set AS.

In step S6 the evaluation e is compared with the threshold value t. If the evaluation value e is larger than the threshold value t, the given workload pattern w is declared to be malicious in step S7, otherwise it is declared to be not malicious in step S8.

The steps S4 to S8 can be repeated for any number of given workload patterns w, as long as the system 1 does not change and archetype set AS and threshold value t can be seen as representative for the normal workload situation.

In further embodiments of the method, the steps S6 to S8 could comprise data processing to take the recent behaviour of the system 1 into account, in particular if steps S4 to S8 are repeated on a regular basis. For example, in step S6 a comparison value could be calculated to be "1" if the evaluation e larger than the threshold value t and "0" otherwise. An average on the comparison values of recent assessments of given workload patterns w is calculated. The average is compared to a predetermined further threshold value, e.g. "0.5". A given workload pattern w is determined to be malicious if the comparison value is 1 for the given workload pattern 1 and the average of recent comparison values is larger than the predetermined further value. Averaging can be performed using any smoothing function. Averaging could, for example, be floating window averaging, where the window comprises a certain number of recent comparison values. Averaging could also be performed by summing up comparison values and imposing an exponential decay (in time) on the sum. The advantage of taking the recent behaviour of the system 1 into account, rather than assessing each given workload pattern w separately is that a workload pattern w deviating from the archetype set is not considered to be malicious if such deviation occurs as a single event, but is considered to be malicious if such deviation occurs more frequently. This resembles the finding that a single deviating workload pattern can always occur within statistical spread, but a more frequent occurrence of deviating workload patterns is likely to originate from a problematic situation.

In an embodiment of the method that uses an inverse distance function to compare two workload patterns w rather than a direct distance function d, all comparing relations used in the Steps S3, S5 and S6 in conjunction with the distance function d are inverted.

The method for determining a malicious workload pattern may be implemented in part or as a whole in software or hardware or a combination thereof. The method may, implemented in hardware, be performed by a device for determining a malicious workload pattern. The method may, implemented in software, be performed by a computer program product. The computer program product may be provided on a computer readable medium embodying software instructions executable by a computer to perform the steps of the method. The computer-readable medium may, for example, be a CD-ROM, a DVD, a flash memory card, a hard disk, or any other suitable computer-readable medium, e.g. a storage medium within a network.

It is to be understood that the examples given above are not limiting in any way. The method for determining malicious workload patterns w can be applied to many different applications in different fields by appropriately choosing the elements 2 and a quantity to describe their usage to define the workload patterns w. The method is advantageously applicable to all cases, in which malicious workload patterns w observed during a problematic or overload situation or an emerging problematic or overload situation differ from workload patterns w observed during normal operation of the system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for determining a malicious workload pattern, the method comprising:
    collecting a training set of workload patterns during a predetermined workload situation, wherein the workload patterns are dependent on a characteristic of the usage of a plurality of elements in a system, the elements being data communication ports, the system being a part of a network;
    determining by a computer processor a subset of the training set as an archetype set, the archetype set being considered to be representative of the predetermined workload situation, wherein determining the archetype set comprises:
        providing a distance function dependent on a comparison of two workload patterns, the distance function resulting in a pattern-to-pattern distance between the two workload patterns, the distance function being dependent on the comparison of two workload patterns in that it relates to changes in a relative order of the elements, the relative order of the elements being determined by the characteristic of the usage of the elements, the usage of each element being representative of the number of accesses to the element through the network in a predetermined time interval,
        providing an archetype set size, the archetype set size being the number of workload patterns to be in the archetype set and the archetype set size being smaller than or equal to a training set size, the training set size being the number of workload patterns in the training set, and
        out of all possible subsets of the training set, the subsets comprising workload patterns, the number of which being equal to the archetype set size, determining the archetype set to be the subset that exhibits the largest value of a set distance, wherein the set distance of a subset is the smallest of all pattern-to-pattern distances between two workload patterns for all possible combinations of two workload patterns within the subset, each pattern-to-pattern distance being determined with the distance function;
    calculating a threshold value dependent on the training set and the archetype set, wherein calculating the threshold value comprises:
        determining a pattern-to-set distance for each workload pattern of the training set, the pattern-to-set distance depending on the workload pattern and on the archetype set in that it is the smallest of all pattern-to-pattern distances between the workload pattern and each of the workload patterns of the archetype set as derived from the distance function, and
        determining the threshold value dependent on a predetermined offset to the largest of the pattern-to-set distances;
    calculating an evaluation value dependent on a given workload pattern and the archetype set, wherein calculating the evaluation value comprises:
        calculating the distances between the given workload pattern and each of the workload patterns of the archetype set, each pattern-to-pattern distance being determined with the distance function, and
        determining the evaluation value to be the smallest of the pattern-to-pattern distances calculated in the step before; and
    determining the given workload pattern to be malicious if the evaluation value fulfils a given condition with respect to the threshold value, wherein the given workload pattern is determined to be malicious if the evaluation value is larger than the threshold value;
    wherein a plurality of given workload patterns are determined to be malicious or not, and wherein the steps of collecting the training set, determining the archetype set and calculating the threshold value are performed once for the plurality of given workload patterns and the steps of calculating the evaluation value and determining the given workload pattern to be malicious are performed for each given workload pattern of the plurality of the given workload patterns.

2. A method for determining a malicious workload pattern, the method comprising:
    collecting a training set of workload patterns during a predetermined workload situation;
    determining by a computer processor a subset of the training set as an archetype set, the archetype set being considered to be representative of the predetermined workload situation;
    calculating a threshold value dependent on the training set and the archetype set;
    calculating an evaluation value dependent on a given workload pattern and the archetype set;
    determining the given workload pattern to be malicious if the evaluation value fulfils a given condition with respect to the threshold value;
    providing a distance function dependent on a comparison of two workload patterns, the distance function resulting in a pattern-to-pattern distance between the two workload patterns;
    providing an archetype set size, the archetype set size being the number of workload patterns to be in the archetype set and the archetype set size being smaller than or equal to a training set size, the training set size being the number of workload patterns in the training set; and
    out of all possible subsets of the training set, the subsets comprising workload patterns, the number of which being equal to the archetype set size, determining the archetype set to be the subset that exhibits the largest value of a set distance, wherein the set distance of a subset is the smallest of all pattern-to-pattern distances between two workload patterns for all possible combinations of two workload patterns within the subset, each pattern-to-pattern distance being determined with the distance function.

3. The method according to claim 2, wherein a plurality of given workload patterns are determined to be malicious or not, and wherein the first three steps are performed once for the plurality of given workload patterns and the last two steps are performed for each given workload pattern of the plurality of the given workload patterns.

4. The method according to claim 2, wherein calculating the threshold value from the training set and the archetype set comprises:
 determining a pattern-to-set distance for each workload pattern of the training set, the pattern-to-set distance depending on the workload pattern and on the archetype set in that it is the smallest of all pattern-to-pattern distances between the workload pattern and each of the workload patterns of the archetype set as derived from the distance function;
 determining the threshold value dependent on the largest of the pattern-to-set distances.

5. The method according to claim 4, wherein the threshold value is determined dependent on a predetermined offset to the largest of the pattern-to-set distances.

6. The method according to claim 2, wherein calculating the evaluation value for the given workload pattern comprises:
 calculating the distances between the given workload pattern and each of the workload patterns of the archetype set, each pattern-to-pattern distance being determined with the distance function;
 determining the evaluation value to be the smallest of the pattern-to-pattern distances calculated in the step before.

7. The method according to claim 2, wherein the given workload pattern is determined to be malicious if the evaluation value is larger than the threshold value.

8. The method according to claim 2, wherein determining the archetype set comprises:
 providing an inverse distance function dependent on a comparison of two workload patterns, the inverse distance function resulting in an inverse pattern-to-pattern distance between the two workload patterns;
 providing an archetype set size, the archetype set size being the number of workload patterns to be in the archetype set and the archetype set size being smaller than or equal to a training set size, the training set size being the number of workload patterns in the training set;
 out of all possible subsets of the training set, the subsets comprising workload patterns, the number of which being equal to the archetype set size, determining the archetype set to be the subset that exhibits the smallest value of an inverse set distance, wherein the inverse set distance of a subset is the largest of all inverse pattern-to-pattern distances between two workload patterns for all possible combinations of two workload patterns within the subset, each inverse pattern-to-pattern distance being determined with the inverse distance function.

9. The method according to claim 8, wherein calculating the threshold value from the training set and the archetype set comprises:
 determining an inverse pattern-to-set distance for each workload pattern of the training set, the inverse pattern-to-set distance depending on the workload pattern and on the archetype set in that it is the largest of all inverse pattern-to-pattern distances between the workload pattern and each of the workload patterns of the archetype set as derived from the inverse distance function; and
 determining the threshold value dependent on the smallest of the inverse pattern-to-set distances.

10. The method according to claim 9, wherein the threshold value is dependant on a predetermined offset to the smallest of the inverse pattern-to-set distances.

11. The method according to claim 8, wherein calculating the evaluation value for the given workload pattern comprises:
 calculating the inverse distances between the given workload pattern and each of the workload patterns of the archetype set, each inverse pattern-to-pattern distance being determined with the distance function; and
 determining the evaluation value to be the largest of the inverse pattern-to-pattern distances calculated in the step before.

12. The method according to claim 8, wherein the given workload pattern is determined to be malicious if the evaluation value is smaller than the threshold value.

13. The method according to claim 2, wherein the workload patterns are dependent on a characteristic of the usage of a plurality of elements in a system.

14. The method according to claim 13, wherein the elements are data communication ports and the system is a part of a network.

15. The method according to claim 14, wherein the usage of each element is representative of the number of accesses to the element through the network in a predetermined time interval.

16. The method according to claim 13, wherein the elements are addresses in a network.

17. The method according to claim 13, wherein the distance function is dependent on the comparison of two workload patterns in that it relates to changes in a relative order of the elements, the relative order of the elements being determined by the characteristic of the usage of the elements.

18. Device for determining a malicious workload pattern in a system, the device being adapted to conduct a method according to claim 2.

19. Computer program product comprising a computer-readable medium embodying program instructions executable by a processor to perform a method according to claim 2.

* * * * *